United States Patent Office

3,380,838
Patented Apr. 30, 1968

3,380,838
SUBSTANCES FOR PRODUCING CRYSTALLINE
HEAT - RESISTANT COATINGS AND FUSED
LAYERS
Werner Sack, Mainz, Germany, assignor to Jenaer
Glaswerk Schott & Gen., Mainz, Germany, a corporation of Germany
No Drawing. Filed July 30, 1964, Ser. No. 386,373
Claims priority, application Germany, Aug. 6, 1963,
J 24,194
5 Claims. (Cl. 106—39)

ABSTRACT OF THE DISCLOSURE

An $MgO\text{-}Al_2O_3\text{-}SiO_2$ glass powder and MgO mixture or/and $Li_2O+Al_2O_3$ additions thereto, which is heated and sintered to produce by chemical reaction crystalline heat resistant coatings.

---

The invention relates to substances for producing crystalline, heat resistant coatings and fused layers and to a method of preparing such substances.

A method of producing crystalline sinter bodies is known in which inorganic compounds are added to a silicate glass powder, the mixture is heated and sintered and the sinter temperature is kept constant for a longer period of time during which the components of the mixture are brought to reaction and devitrification.

It has also been proposed heretofore to add magnesium oxide as an inorganic compound.

In accordance with these two known methods articles are produced which predominantly contain cordierite and/or anorthite and/or spinel and/or forsterite.

It has been discovered that the powder mixtures specified in the known methods can be used for producing crystalline and heat resistant sealing or fusing layers and coatings for quartz bodies, quartz glass, porcelain, ceramics, metals and metal alloys.

The invention resides in the further development of known glass powder mixtures and their range of application and comprises a high-alumina glass powder of the following composition:

| | Percent by weight |
|---|---|
| $SiO_2$ | 54–66 |
| $Al_2O_3$ | 17–27 |
| MgO | 4–12 |
| CaO | 0–10 |
| BaO | 0–1 |
| $B_2O_3$ | 0–3 |
| $TiO_2$ | 0–3 |
| F | 0–0.3 |
| $Na_2O+K_2O$ | ≯0.4 | with powder-like additions of

| | Percent by weight |
|---|---|
| $Al_2O_3$ | 0–22 |
| $LiO_2$ | 0–12 |
| MgO | 4–55 |
| $SiO_2$ | 0–10 | in the form of lithium carbonate ($Li_2CO_3$)
lithium aluminate ($LiAlO_2$)
lithium metasilicate ($Li_2SiO_3$)
magnesium oxide (MgO)
magnesium carbonate ($MgCO_3$)
magnesium silicate ($MgSiO_3$)
aluminum nitrate ($Al(NO_3)_3$)

individually or in combination, for producing crystalline and heat resistant sealing and coating substances for quartz goods, quartz glass, porcelain, ceramics, metals and metal alloys, whereby—if desired—organic binding agents, which can easily be eliminated by burning, may be added to the mixture which is heated and sintered and the sinter temperature is kept constant for a longer period of time during which the components of the mixture are brought to reaction and devitrification.

In accordance with a modification of the invention the glass powder has preferably the following composition:

| | Percent by weight |
|---|---|
| $SiO_2$ | 54.50 |
| $Al_2O_3$ | 26.40 |
| CaO | 10.00 |
| $B_2O_3$ | 2.90 |
| $Na_2O$ | 0.30 |
| $K_2O$ | 0.10 |
| BaO | 0.90 |
| MgO | 4.60 |
| F | 0.30 |

As a sealing material for quartz goods and quartz glass a powder mixture has proven suitable which consists of 72% by weight of the glass powder of the above composition and 6.40 percent by weight $Li_2O$, 21.60 percent by weight $Al_2O_3$, in the form of lithium aluminate.

A powder mixture which according to the invention meets the requirements for sealing and coating substances to be used in connection with molybdenum, sintered corundum and cordierite ceramics consists of 71.50 to 86.00% by weight of the glass powder of the above composition and 14.00 to 28.50% by weight of magnesium oxide. Such substances are used in the manufacture of spark plugs.

For coating and insulating substances for metallic heat conductors consisting of 30% chromium, 5% aluminum and 65% iron the powder mixture according to the invention contains 57% by weight of the aforedisclosed glass powder and 43% by weight of MgO.

The powder mixtures when used according to the invention are not sintered in known manner to dense articles, but the unsintered starting mixtures, or starting mixtures which were presintered to about 1000° Celsius and then were crushed again, are mixed with varying amounts of organic binding agents which can easily be eliminated again by burning, such as oils, turpentine, amylacetate with added nitrocellulose, and the like, and these compositions are ground to a pasty or a thin sprayable consistency depending on their intended use.

Sealing cements for quartz goods and quartz glass products and for the various porcelain and ceramic masses are most efficient in the form of a paste, while for the substance used for producing a protective coating, particularly on metals and metal alloys, a sprayable condition is most advantageous. The pasty sealing substance is deposited by hand in a thin layer between the parts to be joined together, whereas the coating layers are applied either by dipping or by means of spray guns as is customary in the enamel industry. The burning of the layers for the purpose of achieving a mechanically firm and dense connection with the carrier is done in the same fashion as in the manufacture of glazes and glaze enamels in well ventilated electric furnaces by gradually increasing the temperature until the baking temperature is reached, whereby the organic binding agent burns out, and keeping this temperature constant for one half hour to three hours. Protective coatings on heat conductors may advantageously be applied or fused to the heat conductor by directly heating it electrically.

Depending upon the chemical nature of the inventive substances, the required baking temperatures will lie between 1150° to 1250° C. After the baking process the layers in contrast to the glazes and glaze enamels are not vitreous but predominantly crystalline. This accounts also for the fact that such layers in actual continuous use may be heated to 1200° to 1450° C. without being damaged. The operating temperatures of the layers are controlled by the melting points of the different crystals of which the layers are composed.

During the burning process the plasticity of the glass component effects first the wetting and adherence to the carrier. Thereupon, during the subsequent period of baking for one half hour to three hours at the required temperature a chemical reaction of the glass component with the added inorganic compound of the mixture takes place.

For obtaining mechanically durable sealings of the described substances with the various sealing partners it is necessary that the linear coefficients of thermal expansion of both partners be adapted to one another as far as possible within a wide temperature range, because then the mechanical tensions which arise during the sealing process between the two partners can be kept low, thus assuring a good durability.

The aforedescribed substances in the temperature range of 20 to 300° C. and of 40 to 800° C., respectively, have a linear coefficient of thermal expansion of 20 to $107 \cdot 10^{-7}/°$ C. This means that the mixtures according to the invention provide sealing substances and coating layers which are suitable for a multitude of temperature resistant materials of different coefficients of thermal expansion, such as quartz goods, quartz glass, porcelain and ceramic masses, metals and metal alloys.

The appended table shows the melting points and linear coefficients of thermal expansion $\alpha$ (from Jahrbuch für Keramik-Glas-Email 1954/55, page 183 ff.) of the different crystal structures which after the baking process are contained in the substances according to the invention.

Baked-on layers of the inventive mixtures possess also an excellent electric insulating property which makes them valuable in two respects. Firstly, the inventive coatings are able to stop effectively the more or less strong oxidation of almost all metals and metal alloys in the air at temperatures over 1000° C. This is of particular importance for the industrial application of the metals tungsten, molybdenum, niobium and tantalum and their alloys which moreover are gaining an increasing significance in the construction of airplane motors and turbines. Secondly, owing to the high electric insulating property of the coatings according to the invention, for example the coils of a metallic electric heat conductor may be arranged closely adjacent to each other without causing a short circuit. It is obvious that this results in a considerably higher heating effect per cubic unit.

If e.g. pieces of quartz glass or quartz bodies are to be fused together with the aid of powder mixtures according to the invention, at first a glass has to be manufactured having the following composition:

| | Percent by weight |
|---|---|
| $SiO_2$ | 54.50 |
| $Al_2O_3$ | 26.40 |
| CaO | 10.00 |
| $B_2O_3$ | 2.90 |
| $Na_2O$ | 0.30 |
| $K_2O$ | 0.10 |
| BaO | 0.90 |
| MgO | 4.60 |
| F | 0.30 |

The melting process for the manufacture of these glasses differs in nothing from the conventional methods; thus it does not represent any peculiarities for the specialist.

Of the glass obtained in this way, 72 g. are pulverized to a granulation of $<60\mu$ and mixed with 28 g. of pulverized lithium aluminate. This mixture is crushed with 80 to 100 g. of an aqueous ethyl-alcohol solution of about 50% by volume in a ball mill. After that, the crushed material is transformed by evaporation under constant stirring into a dry substance on an electrical sand bath. According to the degree of viscosity desired, the dry powder mixture thus obtained is transformed with more or less amyl acetate in a mortar or in a ball mill into a paste until it is completely free from nodules. It is convenient to add to the amyl acetate 3% of nitrocellulose as a binding agent.

The powder transformed into a paste has to be stirred thoroughly before use and spread in a uniform layer thickness on the quartz substratum to be fused. The second quartz piece is then slightly pressed on the first one, so that there remains yet a coherent, uniform intermediate layer of the paste. The paste pressed out from between the two quartz pieces can be removed or flattened by means of a brush.

At room temperature the solvent evaporates in about 30 minutes. The binding agent contained in the paste fixes the quartz pieces to each other. The sample is heated up in air, starting from room temperature. Up to 500° C. the rate of heating up must not be inferior to ¾–1 hour, in order to slowly remove the organic binder; the further heating up to 1180–1200° C. may be effected at any speed in a conventional furnace.

For fusing together, 1180–1200° C. are indispensable. This temperature is maintained for 30 minutes; afterwards the fused sample may be taken out of the furnace; it is, however, more convenient to cool it down in the furnace.

TABLE

| Crystal Structure | Melting Point in ° Celsius | $\alpha \times 10^{-7}$ | | | |
|---|---|---|---|---|---|
| | | (20–300°)/° C. | (20–500°)/° C. | (20–700°)/° C. | (20–1200°)/° C. |
| Spodumene, $Li_2O \cdot Al_2O_3 \cdot 4SiO_2$ | 1,420 | | | 0.6–8.5 | |
| Eucryptite, $Li_2O \cdot Al_2O_3 \cdot 2SiO_2$ | 1,380 | | | (¹) | |
| Anorthite, $CaO \cdot Al_2O_3 \cdot 2SiO_2$ | 1,550 | 43 | | | |
| Cordierite, $2 MgO \cdot 2Al_2O_3 \cdot 5SiO_2$ | (²) | 11 | | | |
| Spinel, $MgO \cdot Al_2O_3$ | 2,135 | | 75 | | |
| Forsterite, $2MgO \cdot SiO_2$ | 1,890 | | | 105–112 | |
| Lithiumaluminat, $Li_2O \cdot Al_2O_3$ | (³) | | | | 124 |

¹ Strong contraction.
² Decomposition at 1,460° into mullit+glass compound.
³ Sinter temperature of components at 1,500°. From M. Mehmel, Lithiumaluminum silicates as ceramic raw materials, Glas-Email-Keramo-Technik, No. 9, Sept. 1959, pp. 337/340.

What I claim is:
1. A powder mixture which is to be heated and sintered for producing crystalline, heat resistant coatings for quartz goods, quartz glass, porcelain, ceramics, metals and metal alloys, said powder mixture consisting of variable percentages by weight of a high-alumina glass powder having the following composition range:

| | Percent by weight |
|---|---|
| $SiO_2$ | 54–66 |
| $Al_2O_3$ | 17–27 |
| MgO | 4–12 |
| CaO | 0–10 |
| BaO | 0–1 |
| $B_2O_3$ | 0–3 |
| $TiO_2$ | 0–3 |
| F | 0–0.3 |
| $Na_2O + K_2O$ | >0.4 | and powder-like additions of

| | |
|---|---|
| $Al_2O_3$ | 0–22 |
| $Li_2O$ | 0–12 |
| MgO | 4–55 |
| $SiO_2$ | 0–10 | selected from the group of lithium carbonate ($Li_2CO_3$)
lithium aluminate ($LiAlO_2$)
lithium metasilicate ($Li_2SiO_3$)
magnesium oxide (MgO)
magnesium carbonate ($MgCO_3$)
magnesium silicate ($MgSiO_3$) and
aluminum nitrate ($Al(NO_3)_3$).

2. A powder according to claim 1, in which the glass powder has the following composition:

| | Percent by weight |
|---|---|
| $SiO_2$ | 54.50 |
| $Al_2O_3$ | 26.40 |
| CaO | 10.00 |
| $B_2O_3$ | 2.90 |
| $Na_2O$ | 0.30 |
| $K_2O$ | 0.10 |
| BaO | 0.90 |
| MgO | 4.60 |
| F | 0.30 |

3. A powder mixture for producing crystalline, heat-resistant coatings for quartz goods, quartz glass, porcelain, ceramics, metals and metal alloys, in which 72% by weight of a glass powder having the following composition:

| | Percent by weight |
|---|---|
| $SiO_2$ | 54.50 |
| $Al_2O_3$ | 26.40 |
| CaO | 10.00 |
| $B_2O_3$ | 2.90 |
| $Na_2O$ | 0.30 |
| $K_2O$ | 0.10 |
| BaO | 0.90 |
| MgO | 4.60 |
| F | 0.30 | is mixed with 6.4% by weight $Li_2O$ and 21.6% by weight $Al_2O_3$ in the form of lithium aluminate to constitute a sealing substance for quartz goods and quartz glass.

4. A powder according to claim 1, in which 71.5 to 86% by weight of a glass powder having the following composition:

| | Percent by weight |
|---|---|
| $SiO_2$ | 54.50 |
| $Al_2O_3$ | 26.40 |
| CaO | 10.00 |
| $B_2O_3$ | 2.90 |
| $Na_2O$ | 0.30 |
| $K_2O$ | 0.10 |
| BaO | 0.90 |
| MgO | 4.60 |
| F | 0.30 | is mixed with 14 to 28.5% by weight of MgO to form a coating substance for molybdenum, sintered corundum and cordierite ceramics.

5. A powder according to claim 1, in which 57% by weight of a glass powder having the following composition:

| | Percent by weight |
|---|---|
| $SiO_2$ | 54.50 |
| $Al_2O_3$ | 26.40 |
| CaO | 10.00 |
| $B_2O_3$ | 2.90 |
| $Na_2O$ | 0.30 |
| $K_2O$ | 0.10 |
| BaO | 0.90 |
| MgO | 4.60 |
| F | 0.30 | is mixed with 43% by weight of MgO to form an insulating coating for metallic heat conductors including 30% chromium, 5% aluminum and 65% iron.

References Cited

UNITED STATES PATENTS

| | | | |
|---|---|---|---|
| 3,246,972 | 4/1966 | Smith | 106—39 |
| 2,848,349 | 8/1958 | Rechter et al. | 117—129 |
| 2,920,971 | 1/1960 | Stookey | 106—39 |
| 3,037,828 | 6/1962 | Michael | 106—48 X |
| 3,148,994 | 9/1964 | Voss | 106—52 X |

HELEN M. McCARTHY, *Primary Examiner.*